United States Patent [19]

Takahashi

[11] Patent Number: 5,143,028
[45] Date of Patent: Sep. 1, 1992

[54] SUPERCHARGED V-TYPE TWO CYCLE ENGINE

[75] Inventor: Masanori Takahashi, Hamamatsu, Japan

[73] Assignee: Sanshin Kogyo Kabushiki Kaisha, Shizuoka, Japan

[21] Appl. No.: 622,923

[22] Filed: Dec. 6, 1990

[30] Foreign Application Priority Data

Dec. 11, 1989 [JP] Japan ............................. 1-320977

[51] Int. Cl.⁵ ..................... F02B 67/10; F02B 33/38
[52] U.S. Cl. ............................ 123/65 BA; 123/55 VS
[58] Field of Search ........... 123/55 V, 55 VE, 55 VF, 123/55 VS, 65 BA, 55 R, 65 B, 562, 559.1

[56] References Cited

U.S. PATENT DOCUMENTS

| | | | |
|---|---|---|---|
| 1,874,681 | 8/1932 | Woolson | 123/65 BA X |
| 2,099,852 | 11/1937 | Knudsen | 123/48 C |
| 2,252,512 | 8/1941 | Keller | 123/65 BA X |
| 2,259,385 | 10/1941 | Lindenmuth | 123/65 BA |
| 2,366,365 | 1/1945 | Sorensen | 123/55 V X |
| 2,858,666 | 11/1958 | Fullemann | 123/65 BA X |

FOREIGN PATENT DOCUMENTS 58-33225 7/1983 Japan .

*Primary Examiner*—Tony M. Argenbright
*Attorney, Agent, or Firm*—Ernest A. Beutler

[57] ABSTRACT

Several embodiments of V type supercharged two cycle internal combustion engines, in all embodiments the supercharger supplies air to a scavenge manifold that extends at least partially around the cylinder bores and which serves the cylinder bores through a plurality of scavenge passages, each of which is disposed to direct the intake charge away from the exhaust ports. In some embodiments, the supercharger is positioned out of the valley of the V and in one embodiment, the supercharger is positioned in the valley of the V.

13 Claims, 4 Drawing Sheets

5,143,028

SUPERCHARGED V TYPE TWO CYCLE ENGINE

BACKGROUND OF THE INVENTION

This invention relates to a supercharged two cycle V type engine and more particularly to an improved engine having this configuration and scavenging arrangement therefor.

The advantages of two cycle engines in connection with simplicity and high output per unit of displacement are well known. However, the porting of the engine, which contributes to its simplicity, and the two cycle operation also gives rise to certain problems in connection with good performance. It is important to insure that the burnt charge is exhausted from the chamber completely during each cycle of operation and usually the intake charge is utilized to assist in the exhaust scavenging. However, there is a problem of overlap and the intake charge passing out of the exhaust ports. Either the lack of scavenging or excess scavenging and the loss of intake charge can degrade the performance of the engine.

To assist in scavenging, it has been proposed to employ some form of induction system that will introduce the charge at a greater than atmospheric pressure. Supercharging and turbo charging are typical ways in which this was done. However, with boosted engines, there is an additional problem in insuring that the intake charge does not pass out of the exhaust ports.

Furthermore, when the engine is designed as a V type engine, the provision of a supercharger also can give rise to difficulties in engine size. In some engines, the supercharger is placed between the banks of the V type engine but this tends to add to the size of the engine in that the banks may be spread more widely than may otherwise be normally desirable. In addition, the use of a centrally positioned supercharger tends to compromise the induction system and the scavenging ports and their location giving rise to the aforenoted problems of loss of intake air charge.

It is, therefore, a further object of this invention to provide an improved scavenging system for a two cycle V type engine.

It is a further object of this invention to provide an improved V type engine and supercharger and scavenging arrangement therefor.

SUMMARY OF THE INVENTION

This invention is adapted to be embodied in a two cycle engine having a pair of angularly related cylinder banks each containing at least one cylinder bore. A pair of scavenge manifolds each at least partially encircle a bore of a respective cylinder bank. At least one scavenge passage extends from each scavenge manifold to the respective cylinder bore and is opened and closed by a piston reciprocating therein. Means are provided for delivering a pressurized charge to the scavenge manifold.

DETAILED DESCRIPTION OF THE PREFERRED EMBODIMENTS

Figure 1:
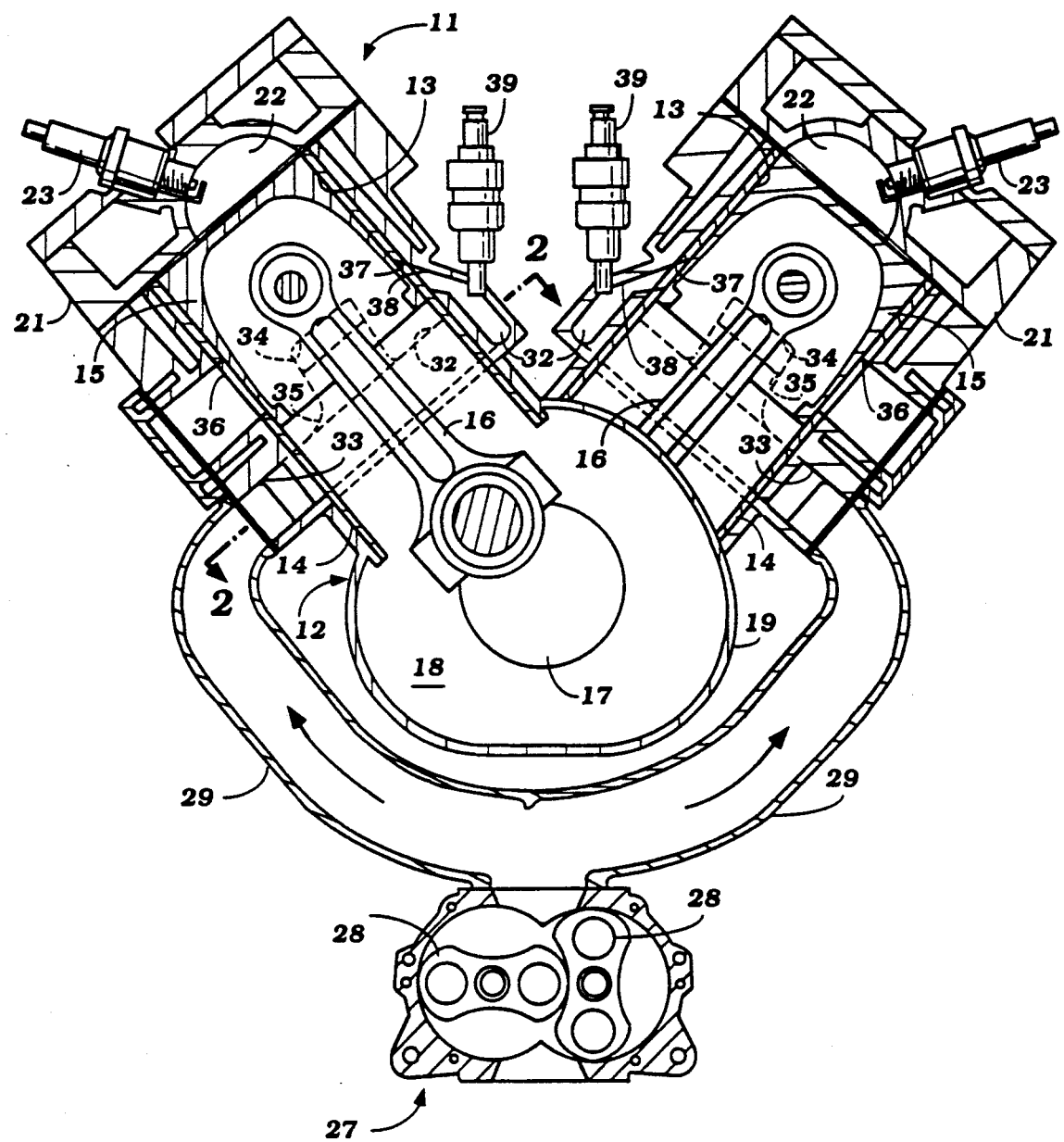
FIG. 1 is a cross sectional view taken through a V type two cycle engine constructed in accordance with a first embodiment of the invention.
Figure 2:
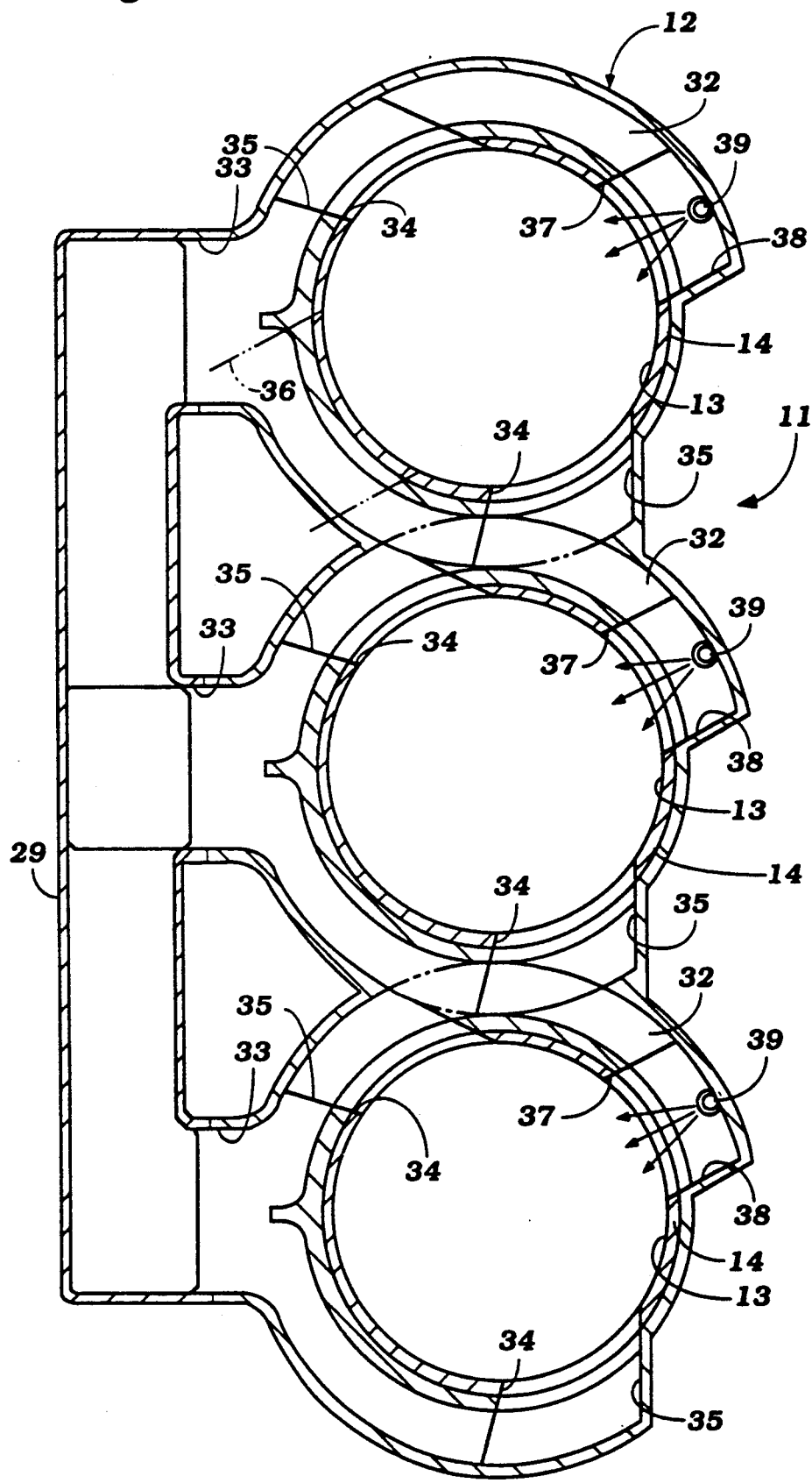
FIG. 2 is a cross sectional view taken through one of the cylinder banks and generally along the line 2—2 of FIG. 1.

Referring first to FIGS. 1 and 2, a V type two cycle crankcase compression engine constructed in accordance with a first embodiment of the invention is identified generally by the reference numeral 11. In the illustrated embodiment, the engine is of the V-6 type, but the invention has utility with V engines having different numbers of cylinders and various angles between the cylinder banks.

The engine 11 is comprised of a cylinder block assembly 12 that is formed with two banks each having three aligned cylinder bores 13, each formed by a respective liner 14. A piston 15 reciprocates within each cylinder bore 13 and is connected by means of a connecting rod 16 to drive a crankshaft 17 for rotation about a rotational axis. The crankshaft 17 is journaled within a crankcase chamber 18 formed by the cylinder block 12 and a crankcase member 19 which is affixed to the cylinder block 12 in a suitable manner.

A cylinder head 21 is affixed to each cylinder block 12 and has individual recesses 22 which cooperate with the cylinder bores 13 and pistons 15 to form variable volume chambers, sometimes hereinafter referred to as combustion chambers. In the illustrated embodiment, the chamber 22 is offset to one side of the cylinder bore 13 adjacent the valley of the V with a squish area being formed around the recess 22. Of course, the invention can be employed in conjunction with engines having other configurations for their combustion chambers.

Spark plugs 23 are mounted in the cylinder heads 21 and have their gaps extending into the respective combustion chambers 22 for firing a charge therein. The spark plugs 23 are fired by a suitable ignition system (not shown).

The construction of the engine as thus far described may be considered to be conventional. For that reason, those conventional components of the engine 11 require no further description because it will be apparent to those skilled in the art how the invention can be utilized with a wide variety of otherwise conventional type of engines.

An air induction system is provided for introducing air for combustion and scavenging directly into the cylinder bores 13 without having to flow first through the crankcase chamber 18. This induction system is, in the illustrated embodiment, of the forced type and includes a throttle body (not shown) in which a flow controlling throttle valve is supported. The air flowing through the throttle body is delivered to a supercharger assembly, indicated generally by the reference numeral 27 and, in the illustrated embodiment, being one of the positive displacement type having a pair of interengaging rotors 28 driven by the crankshaft 17 in a suitable manner. Although the invention is described in conjunction with a supercharged engine and one having a positive displacement supercharger, the invention can be employed in conjunction with centrifugal type superchargers, turbo chargers, other types of devices for increasing atmospheric pressure or, in some instances, purely atmospheric induction systems. The invention, however, has particular utility in conjunction with supercharged or forced induction engines.

The supercharger 27 is, in this embodiment, disposed adjacent one side of the crankcase member 19 so as to provide a relatively compact assembly. However, as will be described, other supercharger locations may be employed in conjunction with the invention.

A manifold 29 delivers the compressed air from the supercharger 27 to each cylinder bank and specifically to individual scavenge manifolds, each indicated by the reference numeral 32 which are formed integrally within the cylinder block 11. Each scavenge manifold 32 is disposed at a lower portion of the cylinder bore 13 and may be positioned below the bottom dead center position of the piston 15. The scavenge manifolds 32 extend, in this embodiment, partially around the circumference of the cylinder liners 14 and specifically their cylinder bores 13. However, complete circumferential extent is also possible with the invention.

Each scavenge manifold 32 has a respective inlet port 33 that opens through the side of the cylinder block 12 away from the valley of the V and which communicates with the manifold 29 for delivery of the compressed air charge to the scavenge manifolds 32. It should be noted from FIG. 2 that the scavenge manifolds 32 have common portions between adjacent cylinder bores 13. This permits the length of the engine to be reduced and because of the porting configuration, to be described, there will be no loss of efficiency or diminution of the equality of flow around the individual cylinder bores 13 because of this commonality of scavenge manifolds 32.

Each cylinder bore 13 is provided with a pair of diametrically spaced apart scavenge ports 34 that open into the cylinder bores 13 at a location that will be uncovered as the pistons 15 approach their bottom dead center position. These scavenge ports 34 are positioned, however, axially above the scavenge manifold 32 as may be clearly seen in FIG. 1. A pair of scavenge passages 35 extend upwardly from the scavenge manifold 32 to the scavenge ports 34. These scavenge passages 35 and the scavenge ports 34 are located so that a charge delivered therefrom will be directly axially away from the manifold inlet 33 and an exhaust port 36 that is disposed above the manifold inlets 33. In this way, the intake charge will be directed away from the exhaust port 36 and this will insure against the loss of any intake charge through the exhaust ports 36. The flow pattern induced in the cylinder bore 13 is such that good scavenging of the exhaust gases will be accomplished.

The exhaust ports 36 open through the outer side of the cylinder block 12 and communicate with an exhaust manifold (not shown) for the discharge of exhaust gases to the atmosphere in a suitable and known manner.

As may be seen in FIG. 2, the ports as thus far described, are rotated so that the scavenge ports 34 do not extend in a line parallel to the axis of rotation of the crankshaft. As a result of this, the scavenge ports 34 of adjacent cylinder bores 13 of each bank will not be aligned with each other, but will communicate with the common portion of the scavenge manifolds 32. This not only permits the cylinder bores 13 to be positioned close to each other and reduce the length of the engine, but also will insure that each scavenge port will receive an equal air flow without starving the others, even though there is this common portion of the scavenge manifold.

A further scavenge port 37 is positioned in communication with the scavenge manifold 32 but diametrically opposed to the exhaust ports 36. The scavenge ports 37 and runners 38 which serve them are directed upwardly toward the cylinder head 21 so that the charge that flows through the scavenge ports will not be directed toward the exhaust ports 36. Again, this insures that the exhaust gases will be well scavenged but that no intake air charge is delivered to the exhaust ports 36 at the time when both the scavenge and exhaust ports are opened.

The scavenge passages or runners 38 are disposed in the valley of the V and individual fuel injector nozzles 39, which may be of any known type, such as fuel injectors per se or air fuel injectors discharge a fuel spray into the scavenge manifolds 32 through these runners 38. This permits the fuel to be well distributed and will insure it is delivered in a direction away from the exhaust ports 36. In this way, the fuel spray from the injectors 39 may be initiated even when the exhaust ports are open and it will be insured that no fuel will spray out of the opened exhaust port.

Figure 3:
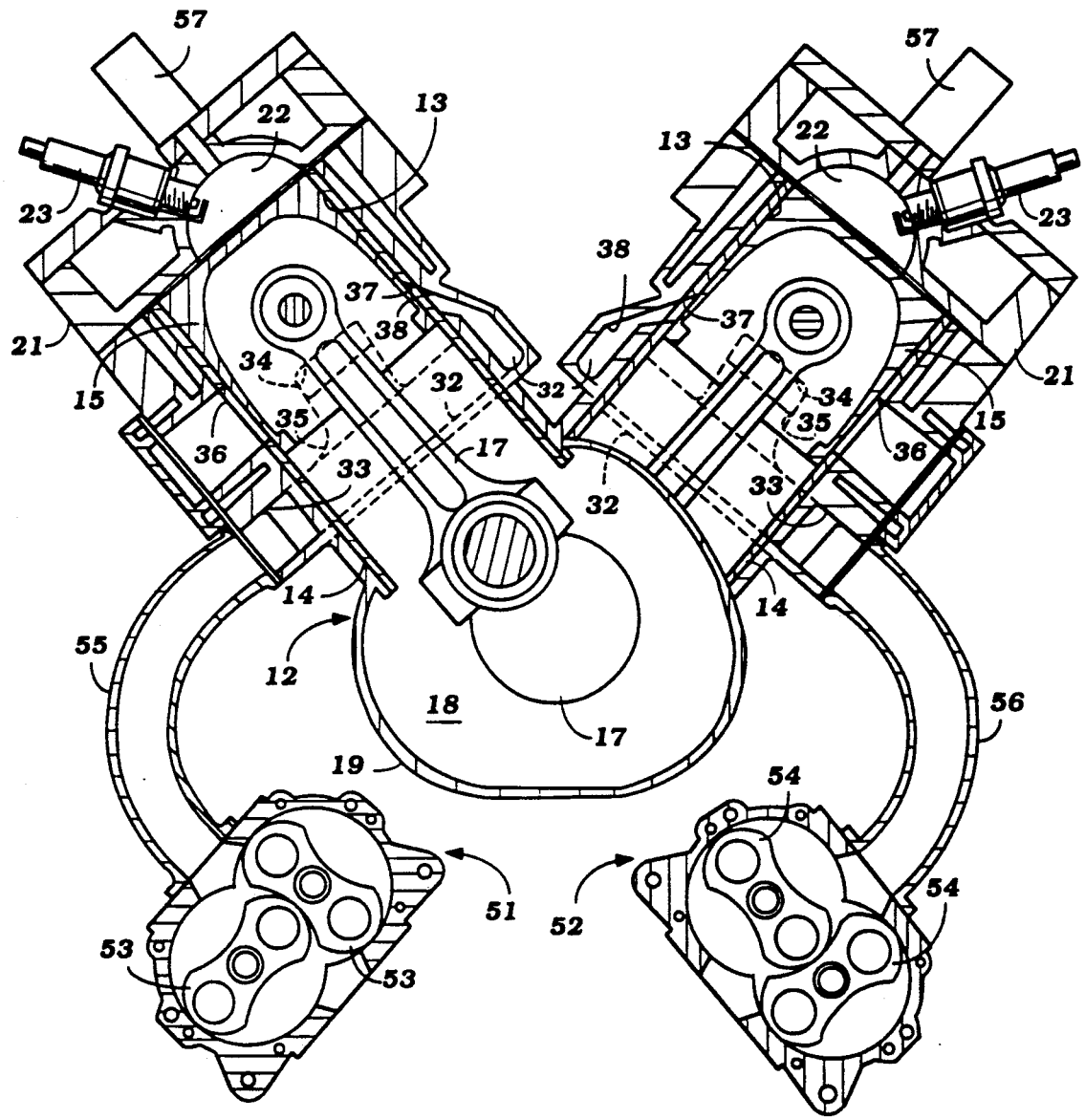
FIG. 3 is a cross sectional view, in part similar to FIG. 1, and shows another embodiment of the invention.

In the embodiment as thus far described, a single supercharger 27 has been provided and the manifold 29 is of the branch type and serves each cylinder bank. The supercharger 27 in the described embodiment is positioned on the same side as the carburetors in a normal carbureted engine of the crankcase compression type. Hence the engine has no greater volume than a conventional carbureted engine. Further compaction may be employed by employing separate superchargers each serving one of the cylinder banks. Such an arrangement is shown in FIG. 3. Except for this difference and the difference in location of the fuel injectors, as will be hereinafter noted, this embodiment is basically the same as the embodiment of FIGS. 1 and 2. For that reason, common components have been identified by the same reference numerals and will be described again only insofar as is necessary to understand the construction and operation of this embodiment.

In this embodiment, there are provided a pair of superchargers 51 and 52, each of which has respective pairs of rotors 53 and 54 which are driven from the crankshaft 17 in a suitable manner. The superchargers 51 and 52 are each served by a throttle valve assembly (not shown) and are positioned below and to the sides of the crankcase member 19. This produces a reduced height for the engine without any increased width. Each supercharger delivers its charge to the scavenge manifolds 32 and specifically their inlets 33 through a respective manifold 55 and 56.

In this embodiment, the fuel injectors are not mounted in the scavenge manifold 32 but rather in the cylinder head as at 57. Of course, the opposite placement may be utilized with each embodiment.

Figure 4:
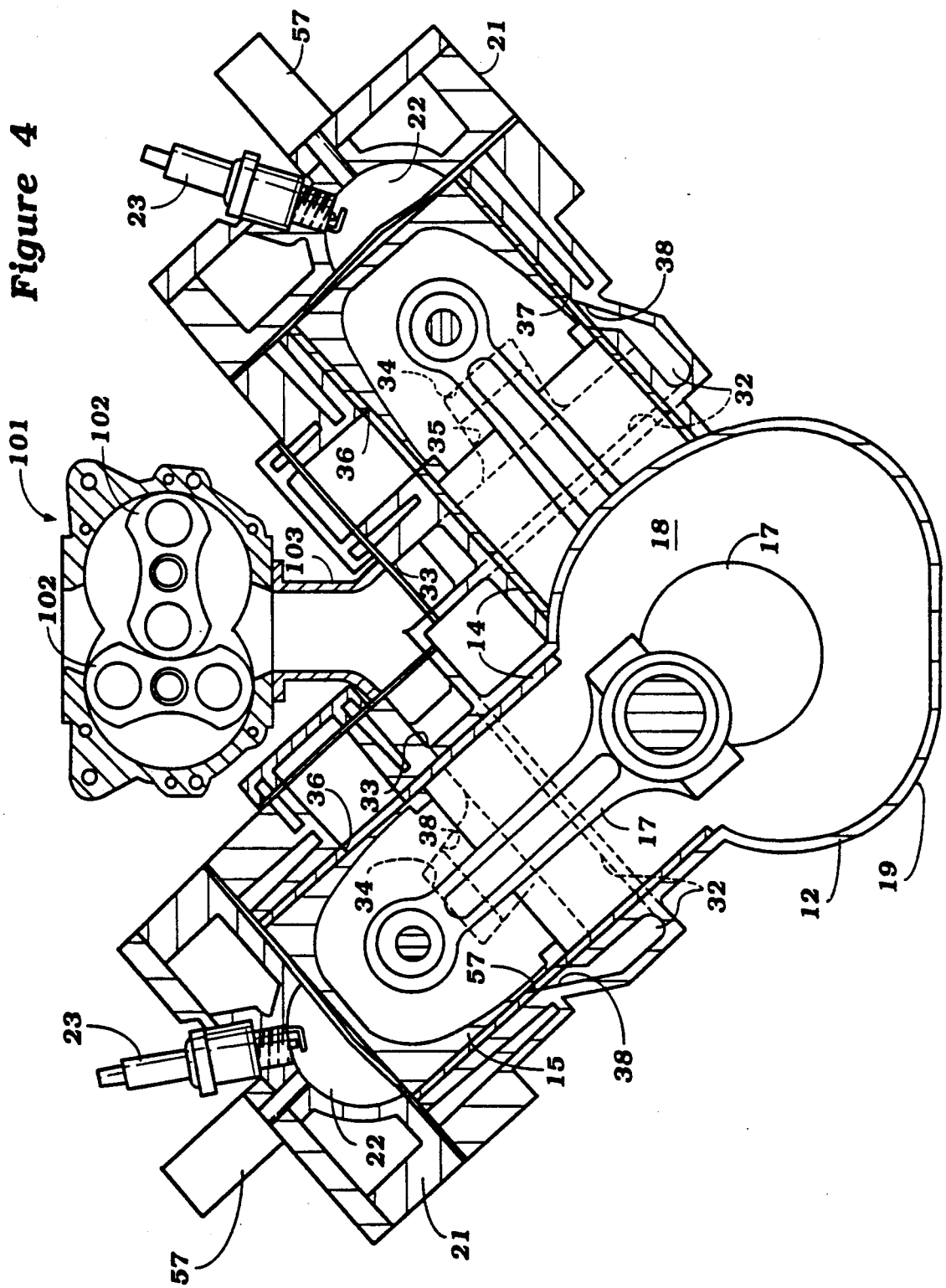
FIG. 4 is a cross sectional view, in part similar to FIGS. 1 and 3, and shows yet a third embodiment of the invention.

In all of the embodiments as thus far described, the supercharger has been positioned outside of the valley of the V of the engine in order to permit a narrow V angle. In some instances, however, it may be desirable to place the supercharger in the area or valley of the V between the cylinder banks and FIG. 4 shows such an embodiment.

In this embodiment, the supercharger is indicated generally by the reference numeral 101 and has a pair of intermeshing rotors 102 that are driven by the crankshaft 17 in a known manner. In this embodiment, components which are the same as the previously described embodiments or similar thereto, have been identified by the same reference numerals. It will be noted that in this embodiment, the scavenge manifolds 32 have their inlets 33 facing the valley of the V and the exhaust ports 36 also face the valley of the V. Hence, a simple Y type manifold 103 may be employed for delivering compressed air from the supercharger 101 to the scavenge manifolds 32. In this embodiment, like the embodiment of FIG. 3, the fuel injectors 57 are positioned in the cylinder heads 21.

It should be readily apparent from the foregoing description that the described embodiments of the invention provide a very compact two cycle V type engine and one in which good scavenging will result without the loss of intake charge through the exhaust port. Although a number of embodiments of the invention have been illustrated and described, various changes and modifications may be made without departing from the spirit and scope of the invention, as defined by the appended claims.

I claim:

1. A two cycle internal combustion engine having a pair of angularly related cylinder banks, defining a valley between said banks, each containing at least one cylinder bore, a pair of scavenge manifolds each at least partially encircling a cylinder bore of a respective bank, at least one scavenge passage extending from said scavenge manifold to the respective cylinder bore and opened and closed by a piston reciprocating therein, a crankcase containing a crankshaft rotatable about an axis, said cylinder banks extending on one side of a plane containing said crankshaft axis, and a supercharger for delivering a pressured charge to said scavenge manifolds positioned externally of said crankcase on the other side of said plane.

2. A two cycle internal combustion engine as set forth in claim 1 wherein a single supercharger is provided for both banks of cylinders.

3. A two cycle internal combustion engine as set forth in claim 2 wherein the supercharger is positioned adjacent at the bottom of the crankcase in opposed position to the valley.

4. A two cycle internal combustion engine as set forth in claim 1 wherein there is provided a supercharger for each bank of cylinders.

5. A two cycle internal combustion engine as set forth in claim 4 wherein each supercharger is positioned to one side of the crankcase and adjacent the cylinder bank served thereby.

6. A two cycle internal combustion engine as set forth in claim 1 wherein there are a plurality of scavenge passages each extending from the scavenge manifold to a respective scavenge port serving the respective cylinder bank, all of said scavenge passages and scavenge ports being disposed to direct the intake charge away from an exhaust port formed in each cylinder bore.

7. A two cycle internal combustion engine as set forth in claim 6 wherein each cylinder bank has multiple cylinder bores each having its own scavenge manifold and scavenge ports with the scavenge manifolds of adjacent cylinders being common.

8. A two cycle internal combustion engine as set forth in claim 7 wherein the scavenge manifolds of adjacent cylinder bores have a common portion.

9. A two cycle internal combustion engine as set forth in claim 8 wherein there are a plurality of scavenge passages each extending from the scavenge manifold to a respective scavenge port serving the respective cylinder bank, all of said scavenge passages and scavenge ports being disposed to direct the intake charge away from an exhaust port formed in each cylinder bore.

10. A two cycle internal combustion engine as set forth in claim 9 wherein a single supercharger is provided for each bank of cylinders.

11. A two cycle internal combustion engine as set forth in claim 10 wherein the supercharger is positioned adjacent at the bottom of the crankcase in opposed position to the valley.

12. A two cycle internal combustion engine as set forth in claim 9 wherein is provided a supercharger for each bank of cylinders.

13. A two cycle internal combustion engine as set forth in claim 12 wherein each supercharger is positioned to one side of the crankcase and adjacent the cylinder bank served thereby.

* * * * *

UNITED STATES PATENT AND TRADEMARK OFFICE
CERTIFICATE OF CORRECTION

PATENT NO. : 5,143,028
DATED : September 1, 1992
INVENTOR(S) : Masanori Takahashi It is certified that error appears in the above-identified patent and that said Letters Patent is hereby corrected as shown below:

Column 6, line 35, Claim 12, after "wherein" insert --there--.

Signed and Sealed this

Twelfth Day of October, 1993

Attest:

BRUCE LEHMAN

Attesting Officer

Commissioner of Patents and Trademarks